United States Patent [19]

Hardy

[11] Patent Number: 5,191,983
[45] Date of Patent: Mar. 9, 1993

[54] MODULAR STORAGE RACK
[75] Inventor: Stephen N. Hardy, Copley, Ohio
[73] Assignee: RTC Industries, Inc., Chicago, Ill.
[21] Appl. No.: 785,926
[22] Filed: Oct. 31, 1991
[51] Int. Cl.⁵ .............................................. A47F 7/00
[52] U.S. Cl. ........................................ 211/40; 211/41;
211/194; 206/387
[58] Field of Search .................. 211/40, 41, 71, 194;
206/387; 312/15, 18, 10

[56] References Cited

U.S. PATENT DOCUMENTS

| | | | |
|---|---|---|---|
| 4,519,655 | 5/1985 | Kamperman | 206/387 X |
| 4,678,245 | 7/1987 | Fouassier | 312/15 |
| 4,819,802 | 4/1989 | Gutierrez | 206/387 |
| 4,844,564 | 7/1989 | Price et al. | 206/387 X |
| 4,900,107 | 2/1990 | Long et al. | 312/15 |

Primary Examiner—Robert W. Gibson, Jr.
Attorney, Agent, or Firm—Dressler, Goldsmith, Shore, Sutker & Milnamow, Ltd.

[57] ABSTRACT

A modular storage rack for CD jewel boxes, or the like, comprising individual tray units that are stackable vertically and connectable laterally. The tray itself has no moving parts but only a ribbon spring which acts to both secure the jewel box when inserted and eject the same when retrieval is desired. Release of the jewel box is obtained by inward pressure against the spring and rotation of the box about a fulcrum on one of the tray walls, permitting the spring to urge the box out of the tray.

16 Claims, 2 Drawing Sheets

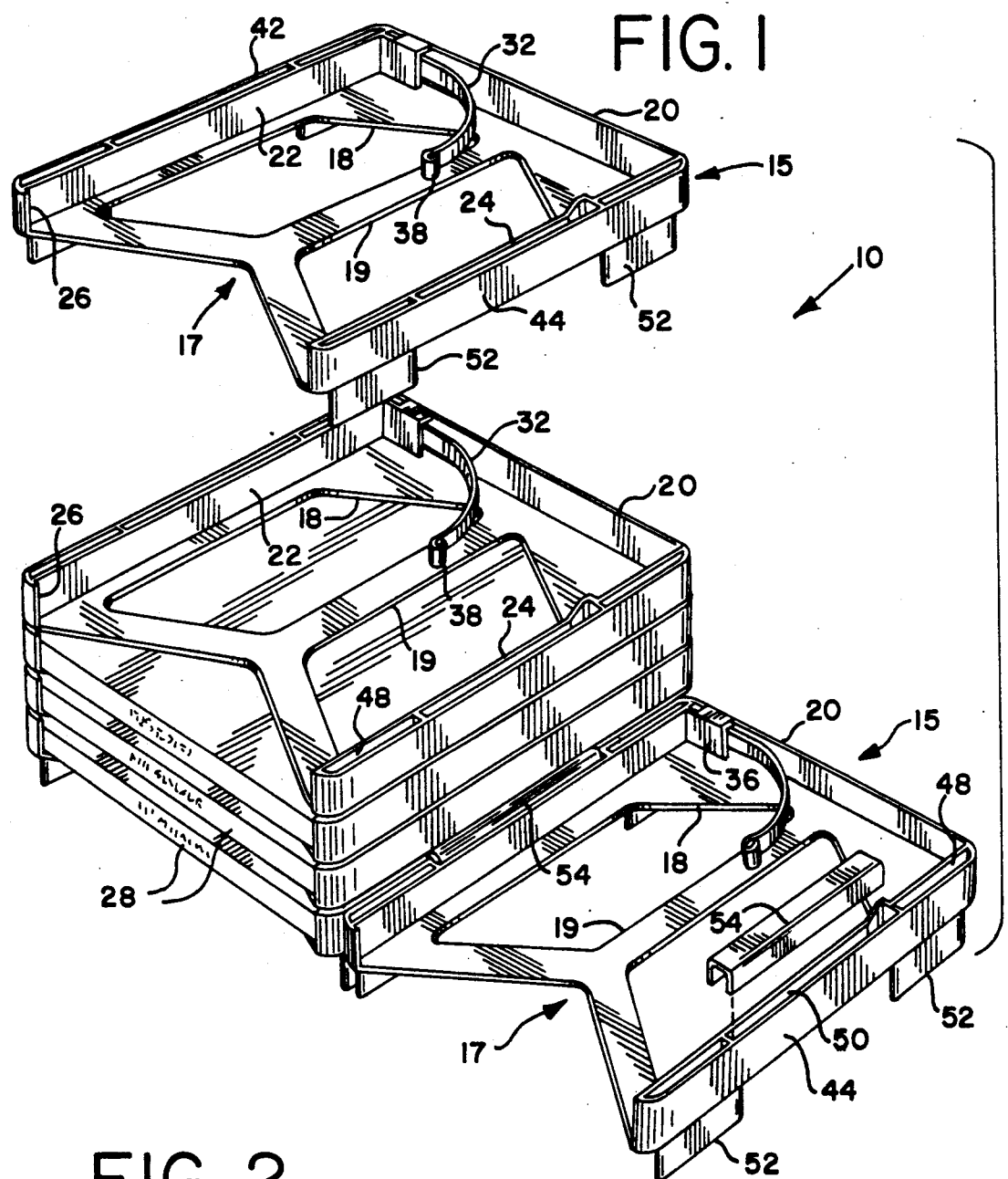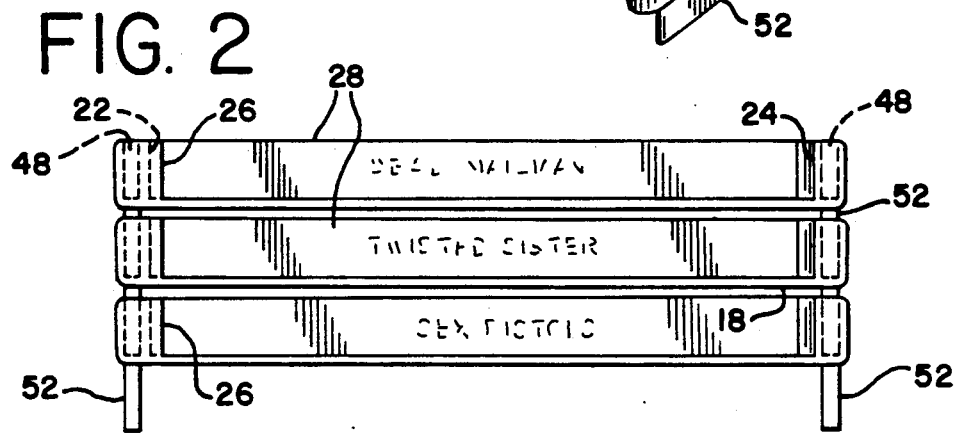

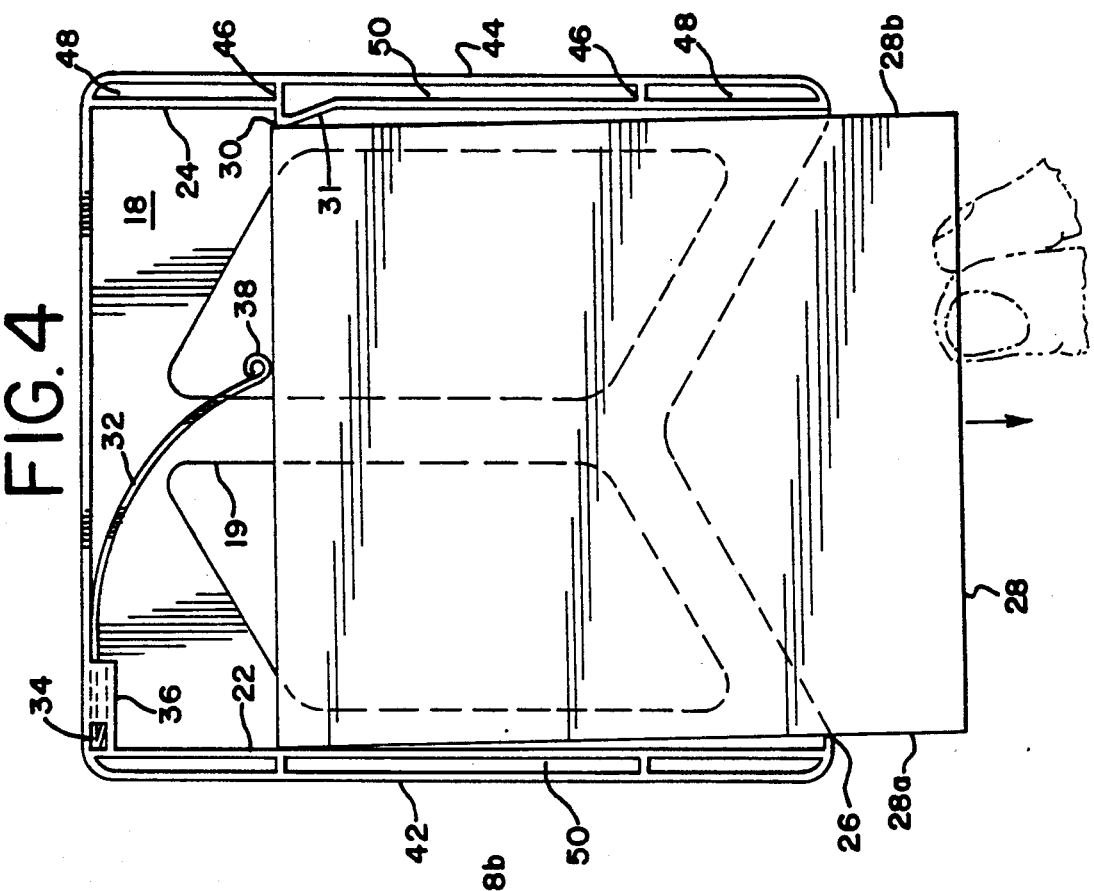
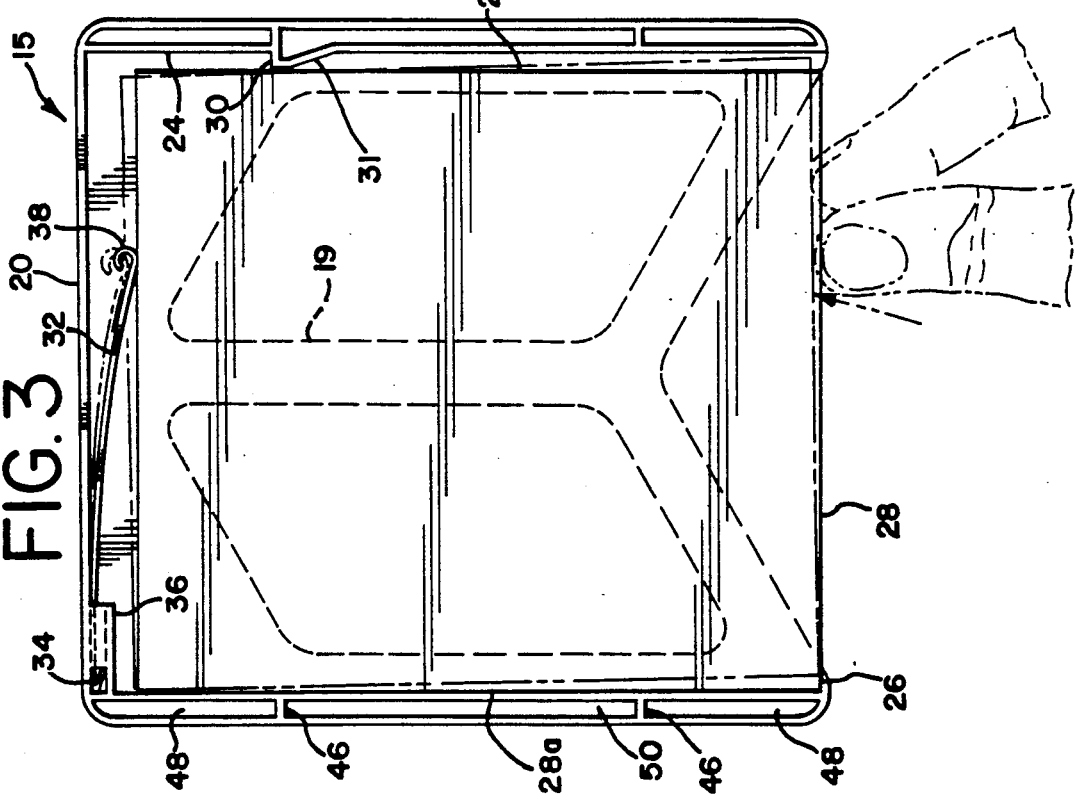

MODULAR STORAGE RACK

BACKGROUND OF THE INVENTION

This invention relates generally to modular and space-saving storage racks and, more particularly, to modular storage racks in which the items being stored are always visible and readily retrievable.

Structures designed to store and display a wide variety of articles are well known. In most cases, the storage structure is designed specifically for the particular article being stored, examples of such structures including wine racks for bottles, bookcases or book shelves, commercial food racks, commercial greeting car racks, etc. Whatever article is involved, the objectives are the same, namely, to store the largest amount of the product in the smallest amount of space while making the product readily visible, accessible and removable.

One class of articles whose problems of storage and display have not yet been satisfactorily addressed is that in which the form of the article is flat and relatively thin. Examples of such thin articles are audio and video recordings including compact discs (CDs), tape cassettes and video cassettes. By way of illustration, a commercial CD container, which is commonly known as a jewel box, measures approximately 4⅞ inch by 5-9/16 inch by ⅜ inch high. The title of the work on the recordings and/or the performer is carried on a label edge measuring 4⅞ inch by ⅜ inch. In the store where the CDs are displayed, the label edge of every CD desirably should be visible and the product itself easily removable from its storage support. Similarly, the consumer at home should be able to store a CD collection so that any desired recording can be easily located and retrieved.

The thin (⅜ inch) dimension of the CD jewel box makes the same difficult to grasp in the normal way, between thumb and forefinger, where the records are stored in close adjacency with each other. On the other hand, a storage rack structure which spaces the adjacent records sufficiently to allow for the insertion of fingers would result in a needless waste of space and materials. Any fixed or permanent storage structure, such as a cabinet or shelving attached to a wall, is furthermore limited as to storage capacity as well as portability.

Storage problems of the type described are also present in automobiles. Many of today's automobiles are equipped with audio systems including CD players and/or cassette tape players. Nevertheless, such automobiles typically provide only a simple console drawer or well, or no structure at all, for holding the tapes and cassettes. In either case, whatever storage means is provided is not satisfactory.

Recent efforts to provide a suitable storage rack for CDs and the like may be seen in U.S. Pat. Nos. 4,900,107 and 4,678,245. Each of those patents shows a storage case and cabinet having a fixed number of vertically arranged shelves. Cooperating with each of the shelves is a securing/release mechanism which includes a flexible lever or finger having a front hook portion for retaining the stored jewel box after insertion. In each patented structure, the CD is released or ejected by movement of the lever and its hook member away from the securing position. In the '107 patent, the jewel box is moved forwardly by the action of a camming surface at the back of the lever against the rear corner of the jewel box. In the '245 patent, ejection of the jewel box is caused by the action of compressed coil springs at the rear of the cabinet. While the patented structures functioned well up to a point, they were nonetheless characterized by certain disadvantageous features. The cabinets are relatively expensive and complex structures having a fixed number of shelves and storage capacity. If a user wished to carry only two or three CDs for listening in the automobile, it was necessary to carry the jewel boxes loose or to carry the entire cabinet, which was both cumbersome and inconvenient.

There thus exists a need for a simple and inexpensive storage means for thin or shallow articles of the type described. Such storage means desirably should have expandable storage capacity and should be portable for use in any environment.

BRIEF SUMMARY OF THE INVENTION

The present invention provides a storage rack for thin articles such as CDs or the like which overcomes the problems alluded to hereinabove. The storage rack is modular both in the vertical or columnar direction and also in the lateral or horizontal direction so that storage capacity is substantially unlimited. The storage rack holds the articles in close, space-saving adjacency, but the articles are nonetheless visible and readily retrievable without requiring insertion of fingers.

Briefly, the invention comprises a modular storage unit in the form of an open-top receptacle or tray of depth approximating the thickness of the article to be stored, for example, a CD jewel box. The tray has a back wall and a pair of inner side walls, but is open at the front except for a small front wall extension at one corner. The width of the tray is slightly greater than that of the CD and spring means is attached to the back wall and normally extends forwardly into the tray. A CD is insertable into the tray whereupon the spring means is compressed and acts to urge the CD against the corner extension and associated side wall to retain the CD.

The opposite side wall is provided with an inwardly extending surface or projection which generally abuts the stored jewel box. When removal of the CD is desired, inward pressure against the non-retained corner of the jewel box causes the jewel box to tilt about the projection which acts as a fulcrum of rotation. The stored energy of the spring means thereupon automatically pushes or ejects the CD tray when inward pressure on the CD is reduced.

The storage unit comprises further a pair of outer side walls spaced from the inner side walls to provide slots therebetween. Pairs of legs depend from the bottom of the storage unit and are receivable in the side wall slots of another storage unit positioned therebeneath. The units are thereby stackable to form columns of indeterminate height. Clip means is provided which is insertable into the side wall slots of a pair of side-by-side storage units to connect the same whereby the storage rack is also modular in the lateral direction.

The storage units are lightweight and occupy a minimum of space so that even a stacked column thereof is readily portable for use wherever desired. Similarly, any number of units may be separated from a column and moved where desired. By the same token, the storage unit may comprise the actual package for the CD to be given to the customer with the CD purchase.

Numerous other advantages and features of the present invention will become apparent from the following detailed description of the invention, from the claims and from the accompanying drawings:

BRIEF DESCRIPTION OF THE DRAWINGS

In the accompanying drawings forming a part of the specification, and in which like numerals are employed to designate like parts throughout, FIG. 1 is an exploded perspective view of a storage rack assembled from a plurality of individual modular storage units embodying the principles of the invention;

FIG. 2 is a front elevational view of a number of vertically stacked storage units each containing a CD jewel box;

FIG. 3 is a top plan view of a storage unit showing a jewel box retained therein and the action taken to release the jewel box therefrom; and FIG. 4 is a similar view showing the jewel box being ejected from the storage unit.

DETAILED DESCRIPTION OF THE INVENTION

Referring with greater particularity to the drawing figures, the reference numeral 10 indicates generally a modular storage rack for CDs or the like embodying the principles of the invention. The storage rack 10 comprises a plurality of individual storage units 15 which may be assembled in any modular fashion as will subsequently become apparent.

Storage unit 15 comprises an open-topped tray 17 having a bottom wall 18, a rear wall 20 and opposed side walls 22 and 24. At the front of the side wall 22, the storage unit comprises a short fragment of a front wall 26. The tray 17 thus is completely open at its front except for the fragmentary front wall 26. The distance between the side walls 22 and 24 is slightly greater than the width dimension of the CD jewel box 28 for which the storage unit 15 is designed. As a weight saving measure and for economy of material, the bottom wall 18 may be formed with a central trip 19 and cutouts as illustrated.

The side wall 24 is provided with a projection 30 having a smooth camming surface 31, said projection decreasing the dimension between the side walls 22 and 24 at that point and also serving as a fulcrum for rotation of a stored jewel box in a manner to be described. An arcuate ribbon spring 32 has one end 34 secured to the rear wall 20 by suitable means such as by frictional engagement in the retainer 36. The spring 32 curves forwardly so that the free end 38 thereof is positioned over central strip 19 when the spring is in the inoperative and relaxed condition (see FIG. 1).

Operation of the storage unit 15 for retaining and releasing a CD may now be appreciated with reference to FIGS. 3 and 4. When a jewel box 28 is inserted through the open front of the tray 17 through pressure applied in a central location on the CD edge, the ribbon spring 32 is stressed or lengthened away from its inoperative condition wherein the spring end 38 is centrally positioned to the condition shown in FIG. 3 wherein the end 38 has been moved off center. Release of inserting finger pressure now results automatically in securement of the jewel box with its front corner engaging the fragmentary front wall 26 and its side edge 28a abutting the tray side wall 22. In this condition, the projection 30 abuts the jewel box side edge 28b, but there is otherwise a gap or space between said side edge and the tray side wall 24. To retrieve the jewel box 28, inward pressure is applied as indicated by the dotted line showing in FIG. 3. Application of this pressure stresses further the spring 32 and causes the jewel box edge 28b to rotate about two pivot points, the tip 38 of the spring and the projection 30, each of which acts as a fulcrum of rotation. Release of the finger pressure permits the spring 32 to eject the box 28 which is possible because the front corner of the box has been rotated free of the fragmentary front wall 26 (see FIG. 4). It is important to note that, except for the spring 32, the entire insertion and retrieval operation is accomplished with no moving parts that are subject to wear or breakage because the jewel box itself functions as the lever of rotation.

It should also be noted that the invention will function for storage and release of objects with only one fulcrum of rotation. Thus, elimination of the projection 30 would nonetheless permit rotation about the spring tip 38 with application of finger pressure at suitable positions to either side of the tray center line.

Referring again to FIGS. 1, 3, and 4, it will be seen that the storage unit 15 comprises outer side walls 42 and 44 spaced, respectively, from the associated tray side walls 22 and 24. The space between said pairs of side walls is partitioned by divider walls 46 to provide front and rear slots 48, 48, and a medial slot 50. Pairs of legs 52, 52, depend from bottom wall 18, said legs being sized and positioned front and rear so that the same are adapted to be frictionally received by the slots 48, 48, of a storage unit 15 positioned therebeneath. The storage unit 15 thus may be stacked vertically to assemble a storage rack 10 of any desired height and CD volume as illustrated in FIG. 1. The legs 52 can be made larger if it is desired to accommodate a double CD unit.

For effecting lateral connection of pairs of storage units 15, the invention comprises clip members 54. The clip member 54 is channel- or U-shaped in section and sized to fit within the medial slot 50 and frictionally engage the respective outer side walls 42 and 44 of a pair of adjacent storage units 15. In this respect, the height of the legs 52 is slightly greater than the depth of the slots, thereby creating a gap between vertically stacked storage units sufficient to accommodate clip members 54. Storage rack 10 thus may be expanded horizontally as well as vertically to any desired size and capacity.

The storage unit 15 may be integrally molded from a suitable lightweight and durable plastic, such as polystyrene. The cost of manufacture can be kept very low since the only assembly operation required is the anchoring of the spring 32. The individual storage units 15 afford convenient portability for any desired number of CDs while enabling assembly of a storage rack of unlimited capacity. The units also permit incremental storage growth relative to the growth of the user's CD collection rather than requiring the purchase of fixed volume structure with unneeded large capacity.

It should be appreciated that a preferred embodiment of the invention has been described herein for illustrative purposes only and is not otherwise limiting of the structure concepts of the invention. For example, while the invention has been described in connection with CD jewel boxes, it applies equally to other similar rigid rectangular objects such as audio cassettes, video cassettes, and the like. Accordingly, changes and variations may be made by those skilled in the art without departing from the spirit and scope of the invention as defined in the appended claims.

What is claimed is:

1. A modular storage rack for storing a plurality of objects such as compact disc boxes, tape cassettes or the like comprising:
   a plurality of individual storage units, each unit being adapted to retain one of said objects therein;
   modular means on said storage unit cooperable for frictionally engaging and stacking one unit above another;
   resilient means in said storage unit cooperable with a first edge of an inserted object for locking and retaining said object in its unit; and
   fulcrum means in said storage unit cooperable with a retained object for rotating said object responsive to inward pressure applied to said object whereby said resilient means urges said object from the storage unit.

2. A storage rack according to claim 1 wherein said unit comprises a tray having a bottom wall, a rear wall, a pair of side walls and a fragmentary front wall projecting from one of said side walls whereby the object is insertable into said unit through the front of said tray.

3. A storage rack according to claim 2 wherein said resilient means cooperates with said first edge of the object to urge the object into engagement with said front wall and said one side wall.

4. A storage rack according to claim 3 wherein said resilient means comprises a ribbon spring having one end secured to said rear wall of the tray and the free end thereof lying substantially midway between said tray side walls when the spring is in the relaxed inoperative condition.

5. A storage rack according to claim 4 wherein said fulcrum means comprises said free end of the ribbon spring.

6. A storage rack according to claim 3 wherein said fulcrum means comprises a projection from the second of said tray side walls whereby inward pressure on said object causes a second edge of said object to bear against and rotate about said projection and release said object from engagement with said front wall and one side wall.

7. A storage rack according to claim 2 comprising an outer wall associated with each of said tray side walls, said outer walls being spaced from their respective tray side walls and forming slots for receiving the modular means of a unit positioned thereabove.

8. A storage rack according to claim 7 wherein said modular means comprises legs depending from said tray bottom wall and in registry with said slots, said legs being frictionally receivable in the slots of a unit positioned therebeneath.

9. A storage rack according to claim 8 wherein said modular means comprises a channel-shaped clip, the legs of said clip being frictionally receivable in the slots of a pair of said units positioned side-by-side.

10. A tray for releasably storing a rectangular object such as a compact disc box, tape cassette or the like comprising:
    a bottom wall, a rear wall, a pair of side walls and a short, front wall fragment projecting from one of said side walls, the distance between said side walls being slightly greater than the width of the object to be stored whereby said object is insertable into the tray through the front thereof;
    resilient means associated with said rear wall and cooperable with the leading edge of said object for securing and releasing the object; and
    pivot means in said tray cooperable with at least one edge of the object for releasing the object from the tray through the front thereof.

11. A tray according to claim 10 wherein said resilient means comprises an arcuate ribbon spring having one end connected to said rear wall and its free end lying substantially midway between said side walls when the spring is in its relaxed condition, said spring adapted to be stressed by the entering leading edge of said object whereby release of the inserting pressure on the object causes said spring to urge the object into securing engagement with said front wall fragment and said one side wall.

12. A tray according to claim 11 wherein said pivot means comprises the free end of said spring, the leading edge of said object being pivotable about said free end.

13. A tray according to claim 12 wherein said pivot means comprises a projection on the other of said side walls, said projection cooperating with a lateral edge of the secured object whereby inward pressure on said object rotates said object about the projection to remove the object from securing engagement with said front wall fragment and one side wall and said spring urges said object out of the front of the tray.

14. A tray according to claim 10 comprising modular means adapted to connect said tray to one or more like trays in vertically stacked or side-by-side relationship.

15. A tray according to claim 14 wherein said modular means comprises an outer wall associated with each of said side walls and spaced therefrom to provide slots, and legs depending from said bottom wall in alignment with said slots, said legs being frictionally receivable in the slots of a tray positioned therebeneath.

16. A tray according to claim 15 wherein said modular means comprises a channel-shaped clip, the legs of said clip being frictionally receivable in the slots of tray and a like tray positioned side-by-side therewith.

* * * * *